United States Patent
Fukutomi et al.

(10) Patent No.: US 7,457,020 B2
(45) Date of Patent: Nov. 25, 2008

(54) OPTICAL SCANNING APPARATUS

(75) Inventors: Akihiro Fukutomi, Mishima (JP); Ken-ichi Tomita, Mishima (JP); Masaki Sato, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/833,629

(22) Filed: Aug. 3, 2007

(65) Prior Publication Data

US 2007/0273949 A1 Nov. 29, 2007

Related U.S. Application Data

(63) Continuation of application No. PCT/JP2007/059816, filed on May 8, 2007.

(30) Foreign Application Priority Data

May 9, 2006 (JP) ............................. 2006-130088

(51) Int. Cl.
*G02B 26/08* (2006.01)
(52) U.S. Cl. ........................ 359/204; 359/822; 359/210
(58) Field of Classification Search ....................... None
See application file for complete search history.

(56) References Cited

U.S. PATENT DOCUMENTS

| | | | | |
|---|---|---|---|---|
| 4,962,983 | A | 10/1990 | Watanabe | 350/6.8 |
| 5,255,115 | A * | 10/1993 | Kikuchi | 359/209 |
| 6,181,363 | B1 | 1/2001 | Satoh | 347/238 |
| 6,313,906 | B1 | 11/2001 | Nagasaka et al. | 355/67 |
| 6,377,705 | B1 | 4/2002 | Sato et al. | 382/197 |
| 6,950,216 | B2 | 9/2005 | Kaneko et al. | 359/204 |
| 2003/0227659 | A1 | 12/2003 | Kaneko et al. | 359/197 |
| 2004/0125192 | A1 * | 7/2004 | Ohsugi | 347/233 |
| 2004/0184127 | A1 * | 9/2004 | Nakajima et al. | 359/204 |

FOREIGN PATENT DOCUMENTS

| | | |
|---|---|---|
| JP | 64-3618 | 1/1989 |
| JP | 1-164917 | 6/1989 |
| JP | 3-42116 | 4/1991 |

(Continued)

*Primary Examiner*—James Phan
(74) *Attorney, Agent, or Firm*—Fitzpatrick, Cella, Harper & Scinto (57) ABSTRACT

The optical scanning apparatus has a first light source, a second light source disposed in a side-by-side relationship with the first light source in a sub-scanning direction, a deflector deflecting respectively a first light beam outgoing from the first light source and a second light beam outgoing from the second light source, and scanning over different scanned surfaces with the light beams, a first optical member provided in a first optical path between the first light source and the deflector, wherein the first light beam outgoing from the first light source passes through, a second optical member provided in a second optical path between the second light source and the deflector, wherein the second light beam outgoing from the second light source passes through, disposed beside the first optical member in the sub-scanning direction, the second optical member having the same optical characteristic as the first optical member, a holding member that holds a side face of the optical member and a side face of the second optical member and positions the first optical member and the second optical member in a main-scanning direction; and an adjusting mechanism adjusting an attitude of the holding member.

4 Claims, 10 Drawing Sheets

FOREIGN PATENT DOCUMENTS

| | | |
|---|---|---|
| JP | 11-119131 | 4/1999 |
| JP | 11-281904 | 10/1999 |
| JP | 2000-39574 | 2/2000 |
| JP | 2000-98277 | 4/2000 |
| JP | 2002-323668 | 11/2002 |
| JP | 2004-12774 | 1/2004 |
| JP | 2004-20607 | 1/2004 |
| JP | 2004-279657 | 10/2004 |

\* cited by examiner

OPTICAL SCANNING APPARATUS

This application is a continuation of International Application No. PCT/JP2007/059816 filed on May 8, 2007, which claims the benefit of Japanese Patent Application No. 2006-130088 filed on May 9, 2006.

BACKGROUND OF THE INVENTION

1. Field of the Invention

The present invention relates to an optical scanning apparatus used for a copying machine and a laser printer.

2. Description of the Related Art

Conventionally, there have been widely utilized a digital copying machine and a printer, wherein electrolatent images are formed by irradiating electrically-charged photosensitive bodies with light beams modulated corresponding to image information, and the images are obtained through electrophotographic processes such as developing, transferring and fixing.

Similarly, a full-color copying machine and a color printer are widely utilized, wherein image signals corresponding to yellow (Y), magenta (M), cyan (C) and black (K) undergo charging, exposing and developing, and a full-color image is formed by superposing and transferring these color images.

Over the recent years, this type of full-color image forming apparatus has taken a widespread so-called tandem system, wherein image forming portions corresponding to the developing colors (Y, M, C, K) are arranged in series, and the full-color image is formed via one path in a way that sequentially superposes the transferred images.

One example of the tandem system is a multi-beam scanning apparatus (refer to Japanese Patent Application Laid-Open No. 2002-323668), wherein a plurality of light beams is arranged on a side-by-side basis in a sub-scanning direction and is made incident on mirror surfaces of a deflection mirror to be rotated, wherein a plurality of scanned surfaces is main-scanned by the plurality of light beams deflected by the deflection mirror. Note that this optical scanning apparatus employs a so-called under-field optical system in which a width, in the main-scanning direction, of the light beams incident on the deflection mirror is set narrower than a width, in the main-scanning direction, of one surface of the deflection mirror.

The optical scanning apparatus discussed in Japanese Patent Application Laid-Open No. 2002-323668 has a configuration that a plurality of cylindrical lenses through which the plurality of light beams incident on the deflection mirror passes are arranged side by side in the sub-scanning direction (vertical direction). In the under-field optical system, however, if the cylindrical lenses arranged side by side in the sub-scanning direction are not arranged with high accuracy in the main-scanning direction, such a problem arises that a scanning start position, in the main-scanning direction, of the light beam scanning over the scanned surface deviates between the plurality of light beams. If a color image is formed by use of the light beams having the deviation in their scanning start positions in the main-scanning direction, the color image results in an image with a color deviation in the main-scanning direction.

By the way, improvement of a recording speed (the number of output sheets per unit time) has increasingly demanded of the image forming apparatus over the recent years. In the printer and the copying machine, the increase in the number of output sheets per unit time must involve increasing a scan speed of the light beams over the photosensitive drums. A scan speed increasing method is exemplified by a method of increasing a rotating speed of a rotary polygon mirror and a method of providing a multi-beam system using a plurality of light sources. An over-field optical system capable of obtaining an increased number of reflection surfaces while restraining a diameter of the rotary polygon mirror, is known as one of the scan speed increasing techniques. The over-field optical system has a characteristic that a width, in the main-scanning direction, of the light beams incident on the rotary polygon mirror is larger than a width, in the main-scanning direction, of one surface of the rotary polygon mirror.

One of the over-field type optical scanning apparatuses is an apparatus including lenses each having power in only the main-scanning direction, wherein the width, in the main-scanning direction, of the light beams emitted from the laser light source is set large (refer to Japanese Patent Application Laid-Open No. 2004-020607).

If the construction that the plurality of light beams arranged side by side in the sub-scanning direction main-scans over the plurality of scanned surfaces through the single deflection mirror, is applied to the over-field optical system, however, the optical elements provided between the plurality of light sources and the deflection mirror are required to be positioned with the high accuracy in the main-scanning direction between the incident optical system elements (e.g., cylindrical lenses) each having the same optical characteristic. If the incident optical system elements are not positioned with the high accuracy in the main-scanning direction, it follows that a distribution of the light quantity used for the plurality of light beams to scan over the scanned surface in the main-scanning direction, differs. If the color image is formed by use of the light beams each having the different light quantity distribution, color densities of the images assuming developing colors (yellow, magenta, cyan, black) differ, and the color image formed by superposing these respective images does not obtain desired coloration.

As described above, in the case of employing either the under-field optical system or the over-field optical system, unless the plurality of incidence optical system elements arranged in the side-by-side relationship in the sub-scanning direction and having the same optical characteristic are arranged with high accuracy so as not to cause a relative positional difference in the main-scanning direction, a quality of the obtained image might deteriorate. Especially in the incidence optical system elements arranged in positions proximal to the light sources, if the relative positional difference exists between the plurality of incidence optical system elements in the main-scanning direction, the image quality is affected much into the deterioration corresponding to how long a distance at which the light penetrating the incidence optical system elements reaches the scanned surface (of a photosensitive body) is.

SUMMARY OF THE INVENTION

It is an object of the present invention to restrain a relative positional difference in a main-scanning direction between a plurality of incidence optical system elements arranged in a side-by-side relationship in a sub-scanning direction and having the same optical characteristic.

It is another object of the present invention to provide an optical scanning apparatus comprising: a first light source: a second light source disposed in a side-by-side relationship with the first light source in a sub-scanning direction; a deflector deflecting respectively a first light beam outgoing from the first light source and a second light beam outgoing from the second light source, and scanning over different scanned surfaces with the light beams; a first optical member provided in a first optical path between the first light source and the deflector, wherein the first light beam outgoing from the first light source passes through; a second optical member provided in a second optical path between the second light source and the deflector, wherein the second light beam outgoing from the second light source passes through, disposed in the side-by-side relationship with the first optical member in the sub-scanning direction, and having the same optical characteristic as the first optical member has; a holding member holding a side face of the optical member and a side face of the second optical member, and positioning the first optical member and the second optical member in a main-scanning direction; and an adjusting mechanism adjusting an attitude of the holding member.

Further features of the present invention will become apparent from the following description of the exemplary embodiments with reference to the attached drawings.

DESCRIPTION OF THE EMBODIMENT

Exemplary embodiments for carrying out the present invention will hereinafter be described in detail with reference to the drawings. Dimensions, materials, shapes and relative arrangements of the components described in the embodiments should be properly changed corresponding to a construction of an apparatus to which the present invention is applied and a variety of conditions, and the scope of the present invention should not be limited to the following embodiments.

First Embodiment

Figure 1:
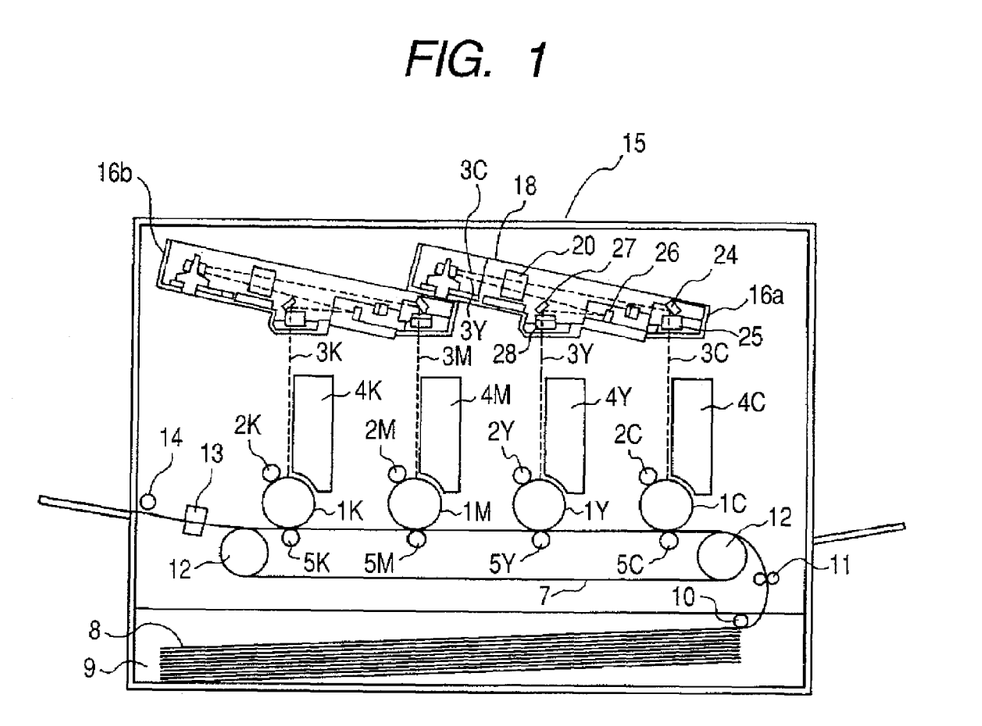
FIG. 1 is a schematic view of an image forming apparatus mounted with an optical scanning apparatus according to a first embodiment.

FIG. 1 is a view illustrating an image forming apparatus 15 mounted with an optical scanning apparatus according to a first working example of the present invention.

In FIG. 1, first and second optical scanning apparatuses 16a, 16b are the same optical scanning apparatuses each of the first and second optical scanning apparatuses 16a, 16b having construction, which will be described later on.

In the first embodiment, respective light beams (laser beams) 3C, 3Y, 3M, 3K each optically modulated based on image information outgo from the optical scanning apparatuses 16a, 16b and are irradiated over surfaces of photosensitive drums 1C, 1Y, 1M, 1K that serve as image bearing bodies corresponding to these light beams, thereby forming latent images. The latent images are formed on the surfaces of the photosensitive drums 1C, 1Y, 1M, 1K that are uniformly charged by primary charging units 2C, 2Y, 2M, 2K, and are visualized into images in cyan, magenta, yellow and black by developing units 4C, 4Y, 4M, 4K. The thus-visualized images are electrostatically transferred in sequence on a sheet 8 conveyed by on a transfer belt 7 in a way that uses transferring rollers 5C, 5Y, 5M, 5K and are thus superposed on each other, thereby forming a color image.

The sheets 8 stacked on a sheet feeding tray 9 are fed sheet by sheet by a sheet feeding roller 10 and are sent by a registration roller 11 onto the transfer belt 7 in a way that takes synchronization with image write timing. During the highly precise conveyance on the transfer belt 7, the cyan image, the yellow image, the magenta image and black image formed on the photosensitive drums 1C, 1Y, 1M, 1K are sequentially transferred onto the sheet 8 and thus superposed on each other, thereby forming the color image.

A drive roller 12 feeds the transfer belt 7 with the high accuracy and is connected to a drive motor (unillustrated) with minute irregularity in rotation. The color image formed on the sheet 8 is, after being heat-fixed by a fixing unit 13, conveyed by a sheet discharge roller 14 etc and is output outside the apparatus.

Figure 2:
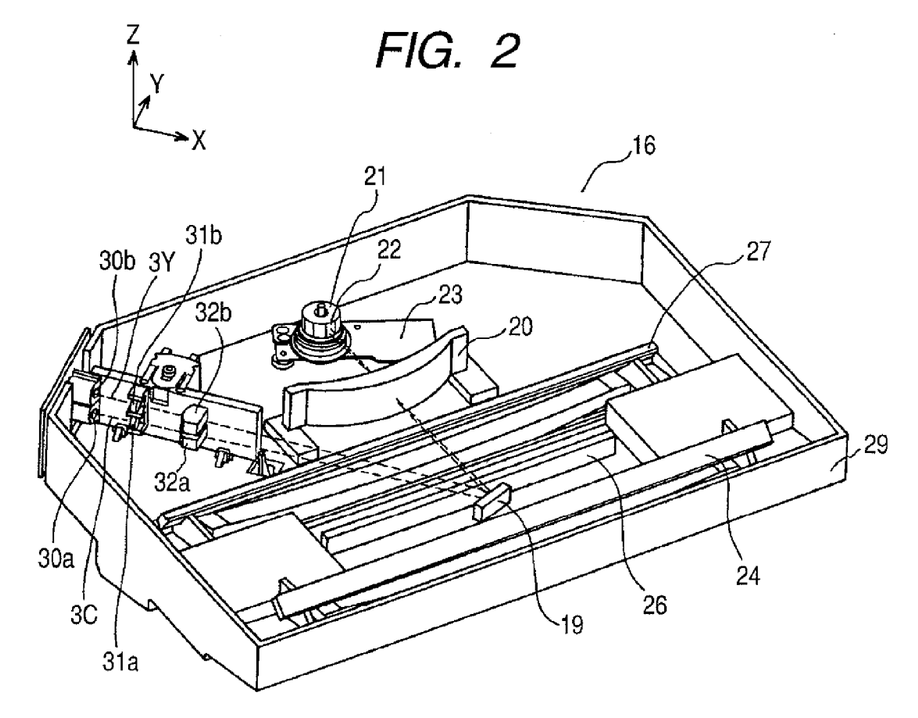
FIG. 2 is an explanatory view of an internal construction of the optical scanning apparatus according to the first embodiment.

FIG. 2 is an explanatory view of an internal construction of the optical scanning apparatus 16 to which the present invention can be applied.

A first light beam 3C and a second light beam 3Y outgoing from a semiconductor laser 30a serving as a first light source and from a semiconductor layer 30b as a second light source, which are disposed up and down in the sub-scanning direction, travel through collimator lenses 31a, 31b and cylindrical lenses 32a, 32b each defined as an optical element. Thereafter, the light beams are changed in their angles by a reflection mirror 19 and are, after passing through a first fθ lens 20, converged on a light beam reflection surface 22 of a rotary polygon mirror 21.

The rotary polygon mirror 21 is rotationally driven by a motor mounted in a drive circuit board 23 and deflects the incident light beam 3. Herein, the rotary polygon mirror 21, the drive circuit board 23 and the motor build up a deflector. The first light beam 3C passes through again the first fθ lens 20, then, after being reflected by a reflection mirror 24, passes through a second fθ lens 25 and is irradiated over the photosensitive drum (the scanned surface) 1C, thereby forming an electrolatent image thereon.

The deflected second light beam 3Y travels through again the first fθ lens 20, then, after being reflected by a reflection mirror 26 and a reflection mirror 27, passes through the second fθ lens 25 and is irradiated over the photosensitive drum 1Y, thereby forming an electrolatent image thereon. The optical components such as the deflector, the reflection mirrors and the fθ lenses are encased in a resinous optical box 29. An upper aperture of the optical box 29 is closed by a lid member 18.

Figure 3:
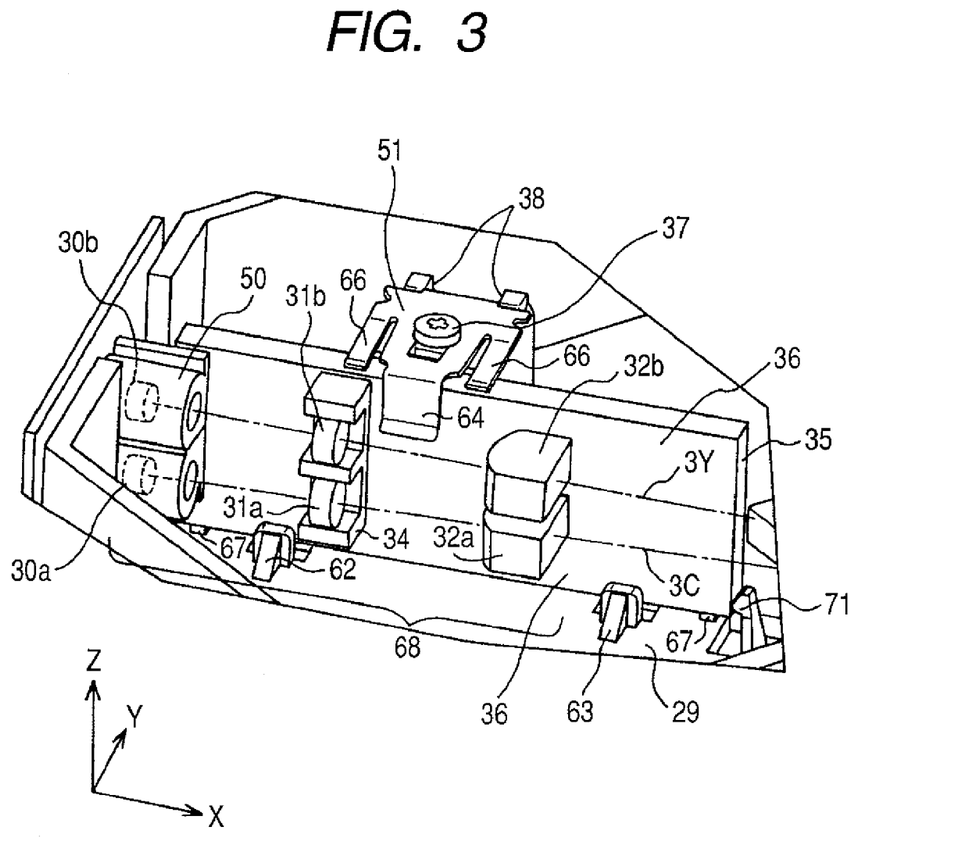
FIG. 3 is an explanatory view of an incidence optical system within the optical scanning apparatus according to the first embodiment.

Subsequently, a first optical system (that is also termed an incidence optical system), which forms a thin and elongate linear image of the light beam emitted from the light source in the vicinity of the deflector in the main-scanning direction, will be described with reference to FIG. 3. In FIG. 3, the z-axis represents a rotational axis of the deflector, i.e., an axis of rotation of the rotary polygon mirror 21, the Y-axis indicates an axis parallel with the main-scanning direction and orthogonal to the Z-axis, and the X-axis is an axis orthogonal to the Z-axis and the Y-axis. Note that the main-scanning direction connotes a direction in which the light beam deflected by the deflector scans over the scanned surface.

As illustrated in FIG. 3, the incidence optical system includes the semiconductor lasers 30a, 30b, the collimator lenses 31a, 31b and the cylindrical lenses 32a, 32b. Herein, a 2-stage configuration is provided, wherein the incidence optical system elements having the same optical characteristic are arranged in the sub-scanning direction. Accordingly, a first optical path is formed between the semiconductor laser (the first light source) 30a and the rotary polygon mirror 21, and a second optical path is formed between the semiconductor laser (the second light source) 30b and the rotary polygon mirror 21. The semiconductor lasers 30a, 30b are fixedly press-fitted in a laser holder 50. The collimator lenses 31a, 31b are fixedly bonded to a collimator lens holder 34. The laser holder 50 and the collimator lens holder 34 abut on and are thus fixed to a plate-shaped holding member 35 in the Y-direction. The cylindrical lenses 32a, 32b abut on and are fixedly, at their end faces (side faces) in the main-scanning direction, bonded to the holding member 35. The Y-directional abutting fixation to the holding member 35 corresponds to positioning by abutting in the main-scanning direction. The holding member 35 is fixed to within the optical box 29 with a press portion, which will be described alter on, formed in the optical box 29 and with an elastic member 51 defined as an adjusting unit. Herein, the incident optical system elements (the semiconductor laser 30, the collimator lens 31, the cylindrical lens 34) and the holding members (the laser holder 50, the collimator lens holder 34) thereof are generically referred to as optical members.

It is to be noted that the light beam 3C and the light beam 3Y are not parallel with the X-axis and are inclined at 1.5° opposed to each other in the Z-direction, wherein a relative angle between the light beam 3C and the light beam 3Y is 3°. In other words, the optical axis of the first light beam 3C is inclined at 3° to the optical axis of the second light beam 3Y.

Figure 4:
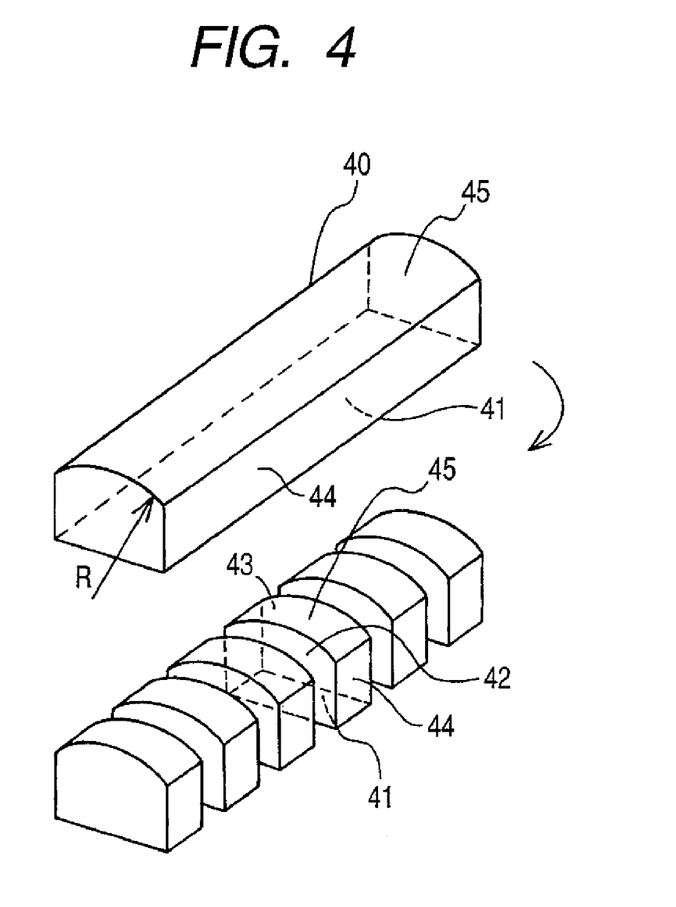
FIG. 4 is a view illustrating a manufacturing process of a cylindrical lens used for the optical scanning apparatus according to the first embodiment.
Figure 5:
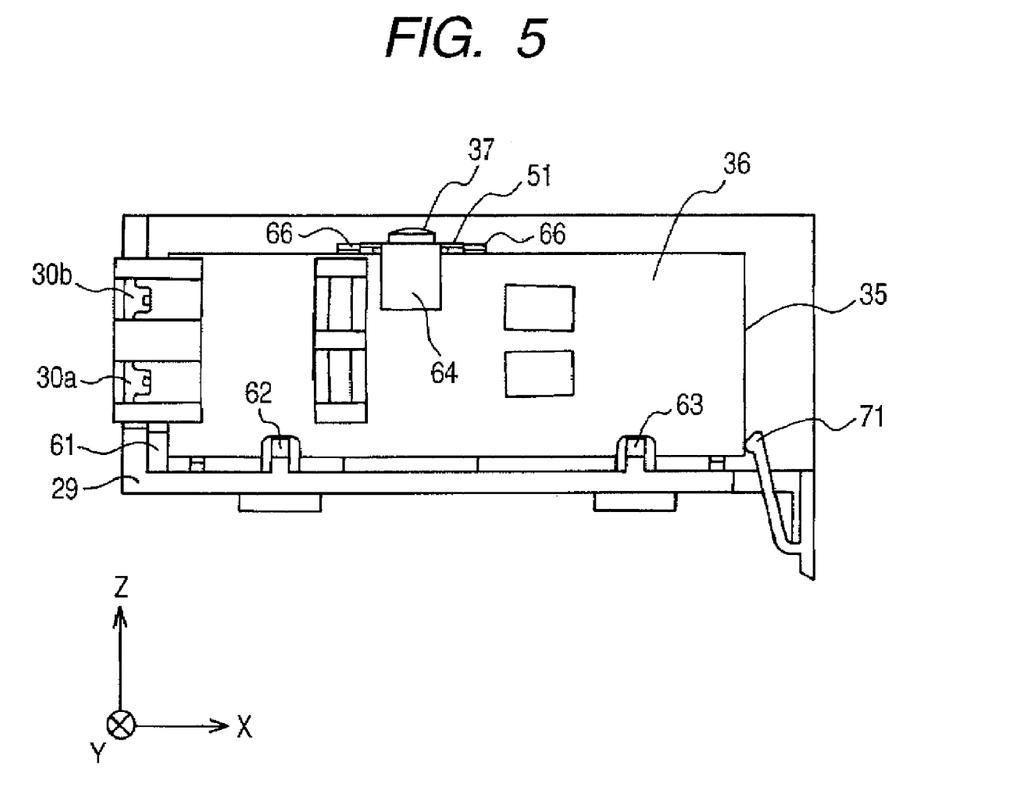
FIG. 5 is a view of a holding member within the optical scanning apparatus according to the first embodiment as viewed in a Y-axis direction.

The cylindrical lenses 32a, 32b are glass lenses each having power (refracting power) only in one direction. A plurality of cylindrical lenses 32a, 32b is manufactured from one base material by grinding a lens surface 45 with a fixed R (curvature) in a way that sets, as reference surfaces, a surface 41 and a surface 44 of the base material 40 that is, as illustrated in FIG. 4, substantially a rectangular parallelepiped, and thereafter cutting the base material 40 to a predetermined length.

When taking such a usage that these lenses exhibit the refracting power only in the main-scanning direction, a cutting surface 42 becomes the reference surface in the sub-scanning direction, and the reference surface 44 when manufacturing the lens becomes the reference surface in the main-scanning direction. Namely, it is advantageous in terms of the accuracy to set the reference surface 44 when working the lens surface 45 as a fitting surface to the reference surface (holding surface) 36 of the holding member 35 because of the lens surface 45 being idealistically disposed with respect to the optical axis.

Next, a method of supporting the holding member 35 within the optical box 29 and a method of adjusting an attitude of the holding member 35, will be described with reference to FIGS. 3, 5, 6 and 7.

The following is the method of supporting the holding member 35 within the optical box 29. Note that X-, Y- and Z-directions, which will be described later on, are the directions illustrated in FIG. 3. Press portions 71, 72, 73 and support portions 61, 62, 63 are formed integrally with the optical box 29.

(Support in X-Direction)

A lower part of the holding member 35 is abutted on and thus fixed to the support portion 61 by the press portion 71.

(Support in Y-Direction)

The lower part of the holding member 35 is at its two points abutted on and thus fixed to the support portions 62, 63 by the press portions 72, 73. In addition, the elastic member (binding member) 51 binding an upper part of the holding member 35 is fixed to the optical box 29 with a screw.

The elastic member 51 has a spring 64 serving as a first elastic portion and a spring 74 serving as a second elastic portion. Herein, the spring 64 functions as a support portion that supports the reference surface (holding surface) 36 of the holding member 35, and the spring 74 functions as a press portion that presses a rear surface of the reference surface 36 of the holding member 35.

The spring 64 is provided to exhibit higher rigidity than of the spring 74. Specifically, the spring 64 and the spring 74 are provided so as to establish k>k', where k is a spring constant of the spring 64, and k' is a spring constant of the spring 74. In the first embodiment, a spring constant ratio between the spring 64 and the spring 74 is set at approximately 3:1.

Three portions formed by the spring 64 and the support portions 62, 63 permit the holding member 35 to rotate about the X-axis (which will hereinafter be called an X-tilt), then support the holding member 35 with the high rigidity against the Y-directional movement, and regulate the holding member 35 from rotating about the Z-axis and the Y-axis as well.

The spring constant of the spring 74 is substantially the same as those of the press portions 72, 73. The spring 74 and the press portions 72, 73 have a function of absorbing a dimensional error of the holding member 35, an attitude change of the holding member 35 and a dimensional fluctuation due to a change in environment ambient to the holding member 35.

The holding member 35 is positioned, by settling such a relationship, following the three support portions formed by the spring 64 and the support portions 62, 63 when fixing the elastic member 51. Flexure portions 65, 75 of the spring 64 and the spring 74, which are provided in the elastic member 51, are disposed with positional deviations in the Z-direction for facilitating insertion into the holding member 35. The optical box 29 is provided with a rotation regulating portion 38 so that the elastic member 51 does not rotate about the Z-axis as a screw 37 is rotated on the occasion of being fixed with the screw.

(Support in Z-Direction)

Two pieces of springs 66 serving as pressing means provided in the elastic member 51 abut and fix a bottom face (the face that faces the optical box) of the holding member 35 against and to the two support portions 67.

In the present optical scanning apparatus, two stages of two incidence optical system elements are arrayed in the way of being disposed in close proximity in the Z-direction (the sub-scanning direction). Such being the case, a relative positional difference in the main-scanning direction between the two incidence optical system elements with respect to the holding face of the holding member 35 can be reduced by providing the holding member 35 that gets the two incidence optical system elements positioned in the main-scanning direction. There might, however, be a case in which perpendicularity between the holding surface and the bottom face (the face that faces the optical box) of the holding member 35 is not sufficient in terms of working accuracy, and a case in which the bottom face of the holding member becomes the cutting face with the result that its face accuracy does not reach a high degree. From this point, such a possibility exists that the perpendicularity of the holding surface of the holding member 35 with respect to the surface to which the holding member 35 of the optical box 29 is fitted does not attain the sufficient accuracy when the holding member 35 is attached to the optical box 29. Acquisition of high image forming performance of the mutual light beams 3C, 3Y entails disposing, with the high accuracy with respect to the optical box 29, the holding member 35 holding an optical element group (an optical member group) 68 building up the incidence optical system. It is therefore required that the perpendicularity of the reference surface (the holding surface) 36 of the holding member 35 with respect to an X-Y plane (the plane orthogonal to the Z-axis) becomes 90° with the extremely high accuracy. In other words, the reference surface 36 needs providing so as to become the surface parallel or approximately parallel with the Z-axis representing the axis of rotation (the rotational axis of the deflector) of the rotary polygon mirror 21.

Therefore, the present optical scanning apparatus includes an X-tilt adjusting mechanism.

Figure 6:
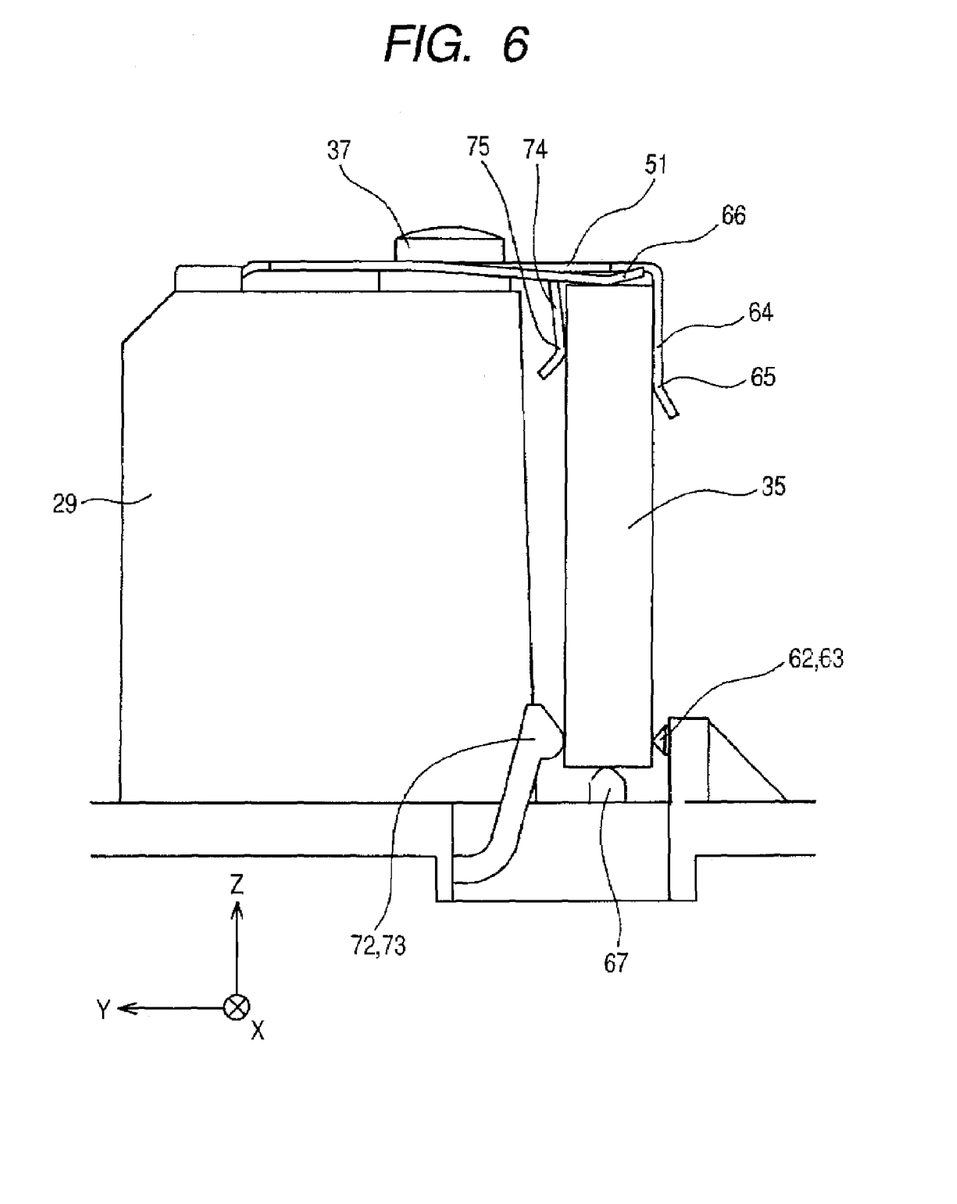
FIG. 6 is a view of the holding member within the optical scanning apparatus according to the first embodiment as viewed in an X-axis direction.
Figure 7:
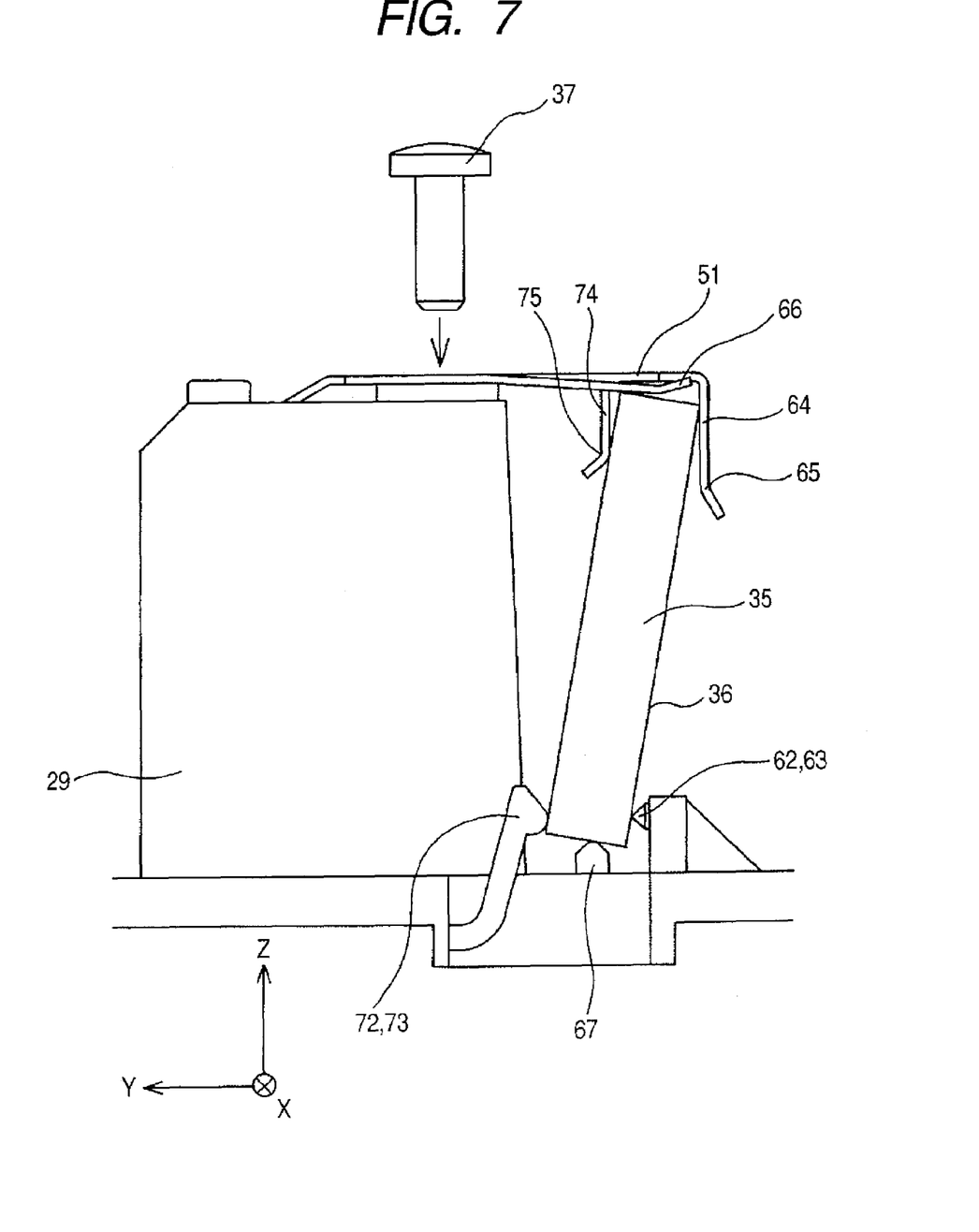
FIG. 7 is a view of the holding member within the optical scanning apparatus according to the first embodiment as viewed in the X-axis direction, illustrating an attitude of the holding member before an X-tilt adjustment.

The X-tilt adjustment of the holding member 35 will be described with reference to FIGS. 6 and 7. FIG. 7 illustrates an attitude of the holding member 35 before the X-tilt adjustment. Omitted is the optical element group 68 including the semiconductor lasers 30a, 30b, the laser holder 50, the collimator lenses 31a, 31b, the collimator lens holder 34 and the cylindrical lenses 32a, 32b.

The X-tilt adjustment of the holding member 35 is conducted in a way that slides the elastic member 51 in the Y-direction. FIG. 6 illustrates an attitude of the holding member 35 after the X-tilt adjustment. When the elastic member 51 is slid in the Y-direction, the holding member 35 rotates about the X-axis, wherein the supporting points are the spring 64, the support portion 62 and the support portion 63. After the X-tilt adjustment, the elastic member 51 is fastened to the optical box 29 with the screw 37, thereby determining the attitude of the holding member 35. Herein, the fixing portion according to the present invention is formed by fastening the screw 37 to the optical box 29, and is disposed in an area on the opposite side to the side on which to hold the optical member, with the holding member being interposed therebetween. With this configuration, the screw 37 can be fastened without any interference with the optical element. It should be noted that the optical element described herein represents at least one element of the optical element group 68 (the semiconductor lasers 30a, 30b, the laser holder 50, the collimator lenses 31a, 31b, the collimator lens holder 34 and the cylindrical lenses 32a, 32b).

Subsequently, an in-depth description of a method of supporting the lower part of the holding member 35 will be given.

Figure 8:
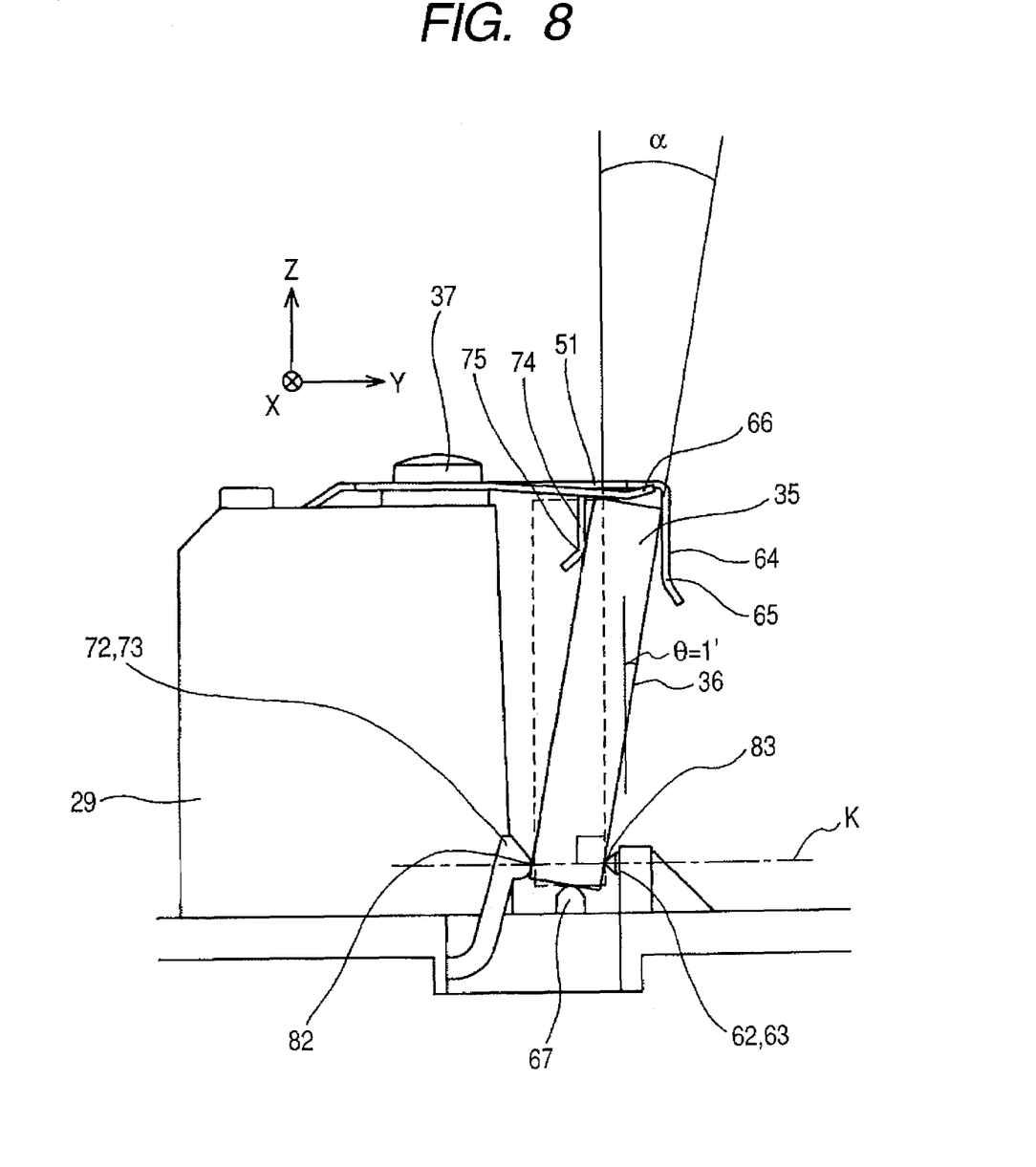
FIG. 8 is an explanatory view of an adjusting mechanism within the optical scanning apparatus according to the first embodiment.

FIG. 8 illustrates the attitude of the holding member 35 after the X-tilt adjustment.

Figure 9:
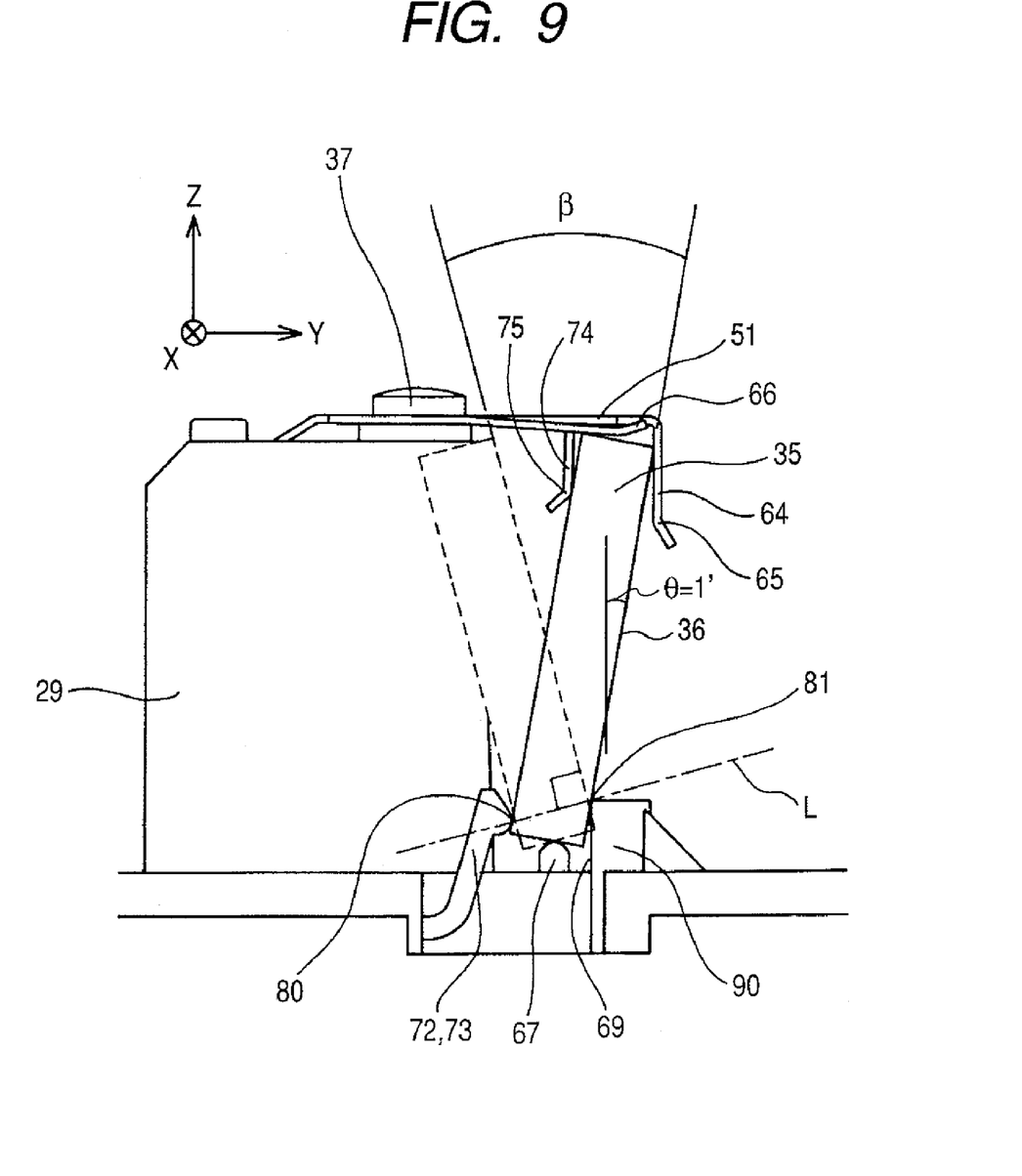
FIG. 9 is a view of a general example illustrating effects of the first embodiment.

In the first embodiment, an X-tilt angle after the X-tilt adjustment is set equal to or smaller than 1°. This setting is done corresponding to an image deterioration allowable range of the color image. The subsequent drawings depict the X-tilt angle in exaggeration to facilitate the description. FIG. 8 is an explanatory view of the first embodiment. FIG. 9 illustrates a general example of how the first embodiment exhibits effects.

FIG. 9 illustrates that a round boss 90 protruding in the Z-direction supports the reference surface 36. Actually, the holding member 35 is held at a minute angle θ, and hence an upper support point 81 of a ridge line 69 is brought into a point-contact with the reference surface 36.

In this case, a force of centering action to return the attitude of the holding member 35 in the direction orthogonal to a straight line L that connects the holding point 80 to the support point 81 within a Y-Z plane, occurs in the holding member 35 fixed by the screw to the optical box 29, whereby the holding member 35 reverts to the attitude depicted by a broken line. Accordingly, with the occurrence of the force of centering action, a residual stress occurs in the elastic member 51, with the result that the holding member 35 has a fluctuation in the X-tilt angle which occurs when the stress is relaxed due to a fluctuation in environment. The adjustment becomes difficult due to the unstable attitude of the holding member 35 when making the X-tilt adjustment.

On the other hand, in the first embodiment, as illustrated in FIG. 8, the press portions 72, 73 press the rear surface of the reference surface 36 on the side opposite to the support portions 62, 63. The support portions 62, 63 have tapered front edges and come into the point-contact with the reference surface 36 of the holding member 35, wherein the contact points of the support portions 62, 63 with the reference surface 36 exist on the same straight line parallel with the X-axis. Hereat, an angle α made by the reference surface 36 and by the direction orthogonal to a straight line K that connects a holding point 82 to a support point 83 within the Y-Z plane, is given such as α<β. The angle β is, as illustrated in FIG. 8, an angle made by the reference surface 36 and by the direction orthogonal to the straight line L that connects the holding point 80 to the support point 81 within the Y-Z plane when the round boss 90 protruding in the Z-axis supports the reference surface 36. A magnitude of the force of centering action depends on a magnitude of the angle described above.

Therefore, as in the first embodiment, the support portions 62, 63 supporting the reference surface 36 of the holding member 35 so that the straight line K connecting the holding point 82 to the support point 83 is in parallel with the Y-axis, are brought into the point-contact with the reference surface 36, thereby enabling the force of centering action from being restrained to the minimum and the stable attitude of the holding member 35 to be maintained. Note that at least three support portions supporting the reference surface 36 of the holding member 35 are provided, and at least two portions (the support portions 62, 63 in the first embodiment) among the three support portions are, it may be enough, brought into the point-contact with the reference surface 36. Another available scheme is that among the support portions supporting the reference surface 36, at least one portion is so provided as to be in point-contact with the reference surface 36.

Thus, according to the first embodiment, the adjustment of rotating the holding member 35 easily about the X-axis can be conducted simply by moving the elastic member 51 in the Y-direction.

The Y-directional position (in the main-scanning direction) of the holding member 35 is determined, following the three support portions that support the reference surface (holding surface) 36, and the holding member 35 is bound by the three support portions and by the three press portions that press the rear surface of the reference surface 36. With this contrivance, even when adjusting the optical element group 68 arranged in the holding member 35 after fixing the holding member 35 to the optical box 29, the X-tilt quantity of the holding member 35 can be restrained to the minimum on the occasion of making the adjustment by pressing the optical elements against the reference surface 36 of the holding member 35.

The elastic member 51 is fixed by the screw to the optical box 29 on the rear surface side of the reference surface 36, and hence it is feasible to ensure the space in which to arrange the adjusting tools of the optical element group 68. Accordingly, the assembly process having a high degree of freedom can be established.

The scheme in the first embodiment is that the reference surface 36 of the holding member 35 is abutted against the support portions 62, 63 of the optical box 29 and against the spring 64 of the elastic member 51, thus pressing the rear surface of the reference surface 36 with the press portions 72, 73 having lower spring constants than of the support portions 62, 63 and with the spring 74. With this scheme, even if the holding member 35 is thermally expanded, the positional fluctuation of the reference surface 36 of the holding member 35 can be restrained owing to the press portions 72, 73 and the flexure of the spring 74. Namely, the positional deviation of the light beam can be restrained.

The force of centering action of the holding member 35 can be restrained to the minimum, and the stable attitude of the holding member 35 can be maintained.

In addition, the construction that the elastic member 51 includes both of the mechanism for positioning the holding member 35 by pressing the holding member 35 in the Z-direction and the mechanism for regulating the Y-directional sliding motion, enables realization of adjusting and fixing the holding member 35 with the construction that is as extremely low of cost as providing the single elastic member 51.

Second Embodiment

Figure 10:
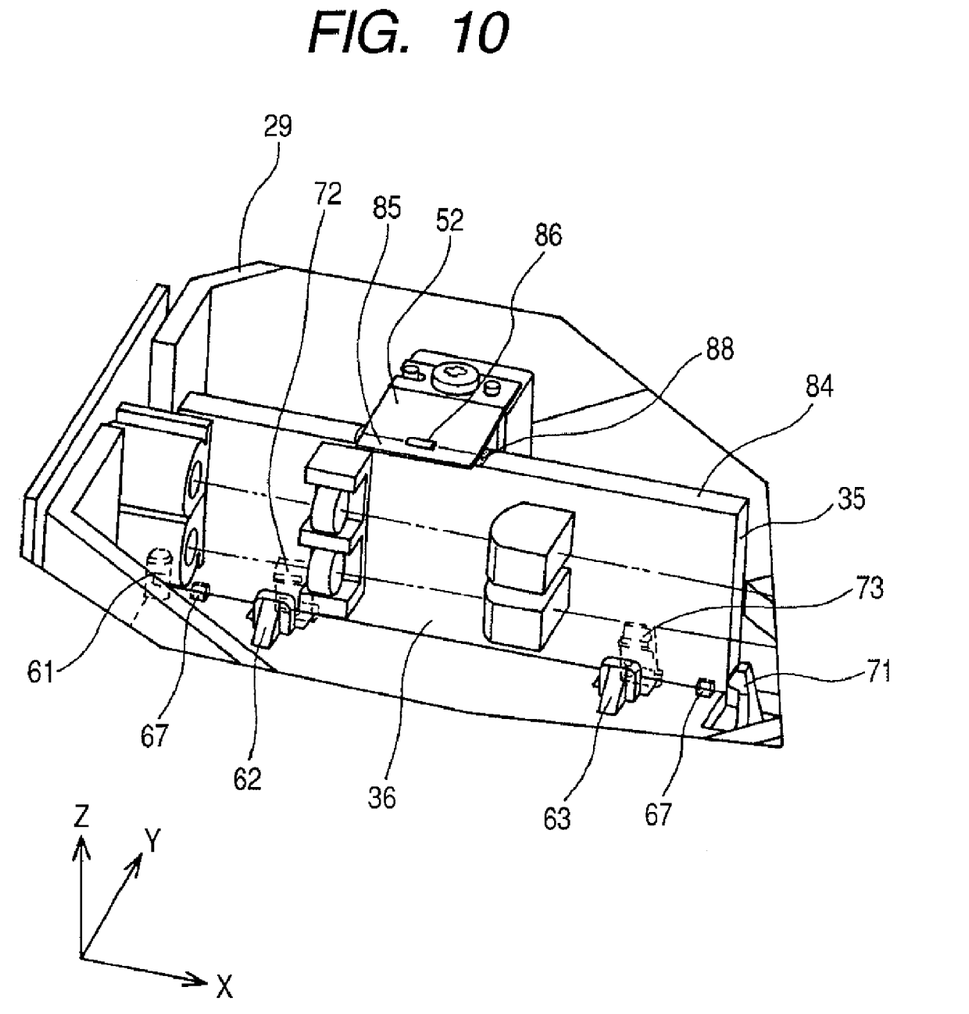
FIG. 10 is an explanatory view of an incidence optical system within the optical scanning apparatus according to a second embodiment.

FIG. 10 is an explanatory view of a second embodiment to which the present invention can be applied. The same components as those in the first embodiment are marked with the same numerals and symbols, and their descriptions are omitted.

In the second embodiment, to begin with, in the same way as in the first embodiment, the lower part of the holding member 35 is press-fixed at the two points (the Y-direction) of the support portions 62, 63 and the press portions 72, 73 and at one point (the X-direction) of the support portion 61 and the press portion 71.

The elastic member 51 fixed by the screw to the optical box 29 presses an upper surface 84 (a rear surface of the surface that faces the optical box) of the holding member 35 in the Z-direction. A front edge portion 85 (a bonding support portion) of an elastic member 52 and the upper surface 84 of the holding member 35, are fixed by bonding. A hole 86 is a hole for filling a bonding agent 88.

To summarize a method of supporting the holding member 35 within the optical box 29, the method is described as follows.

(Support in X-Direction)
The method is absolutely the same as in the first embodiment.

(Support in Y-Direction)
In the same way as in the first embodiment, the lower part of the holding member 35 is abutted against and fixed to, at the two points, the support portions 62, 63 by the press portions 72, 73. The upper part of the holding member 35 is held by bonding the upper surface 84 thereof to the elastic member (bonding support member) 52.

(Support in Z-Direction)
The holding member 35 is abutted against and fixed to the support portion 67 by the elastic member 52. In the second embodiment, the holding member 35 is supported at totally three points including the two points of the lower part within the reference surface 36 and one point of the upper surface 84 thereof. With this scheme, even when making the adjustment by abutting the optical element group 68 arranged in the holding member 35 against the reference surface 36 after fixing the holding member 35 to the optical box 29, the X-tilt quantity of the holding member 35 can be restrained to the minimum.

The holding member 35 is fixed by bonding to the elastic member 52, and hence, even if the thermal expansions of the holding member 35 and of the bonding agent 88 occur due to a rise in temperature of the optical scanning apparatus, the positional fluctuation of the holding member 35 can be restrained owing to the flexure of the elastic member 52. In addition, the bonding agent 88 can be avoided from being exfoliated.

The elastic member 52 is fixed by the screw to the optical box 29 on the rear surface side of the reference surface 36, and therefore the same effects as in the first embodiment can be acquired.

Additionally, the elastic member 52 includes both of the mechanism for positioning the holding member 35 by pressing the holding member 35 in the Z-direction and the mechanism for regulating the Y-directional sliding motion, and hence the same effects as in the first embodiment can be obtained.

It should be noted that the present invention is not limited to the constructions of the embodiments discussed above and may adopt a construction including a plurality of elastic members 51 or 52. As a matter of course, the shapes of the holding member 35 and of the elastic members 51, 52 are not confined to those exemplified in the embodiments. In place of the support portions 61, 62, 63 and the press portions 71, 72, 73 that are formed integrally with the optical box 29, the press member may also be provided separately. The elastic member 51 may be provided with the two springs separately, i.e., the spring that presses the holding member 35 in the Z-direction and the spring that adjusts the X-tilt.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-130088, filed on May 9, 2006, which is hereby incorporated by reference herein in its entirety.

What is claimed is:
1. An optical scanning apparatus comprising:
a first light source;
a second light source arranged beside said first light source in a sub-scanning direction;

a deflector that deflects respectively a first light beam outgoing from said first light source and a second light beam outgoing from said second light source, and scans over different scanned surfaces with the light beams;

a first optical member provided in a first optical path between said first light source and said deflector, wherein the first light beam outgoing from said first light source passes through said first optical member;

a second optical member provided in a second optical path between said second light source and said deflector, wherein the second light beam outgoing from said second light source passes through said second optical member which is disposed beside said first optical member in the sub-scanning direction, said second optical member having same optical characteristics as optical characteristics of said first optical member;

a holding member that holds a side face of said first optical member and a side face of said second optical member, and positions said first optical member and said second optical member in a main-scanning direction; and a rotating mechanism that regulates said holding member from rotating about a Z-zxis and Y-axis but permits said holding member to rotate about an X-axis, wherein an axis parallel with a rotational axis of said deflector is defined as the Z-axis, an axis parallel with the main-scanning direction and perpendicular to the Z-axis is defined as the Y-axis, and an axis perpendicular to the Z- and Y-axes are defined as the X-axis.

2. An optical scanning apparatus according to claim 1, wherein said rotating mechanism includes a binding member that binds a holding surface and a rear surface of the holding surface of said holding member holding the side face of said first optical member and the side face of said second optical member, and permits said holding member to rotate about the X-axis as said binding member is moved.

3. An optical scanning apparatus according to claim 1, further comprising an optical box encasing said deflector, said first optical member, said second optical member and said holding member, wherein said rotating mechanism includes a bonding support member supporting by bonding a rear surface of a surface facing said optical box, of said holding member, and permits said holding member to rotate about the X-axis as said bonding support member is moved.

4. An optical scanning apparatus according to claim 1, wherein said first optical member and said second optical member are cylindrical lenses each having refracting power only in the main-scanning direction.

* * * * *